US010210602B2

(12) United States Patent
Campbell (10) Patent No.: US 10,210,602 B2
(45) Date of Patent: Feb. 19, 2019

(54) SYSTEM AND METHOD FOR NORMALIZED FOCAL LENGTH PROFILING

(71) Applicant: Sharp Laboratories of America (SLA), Inc., Camas, WA (US)

(72) Inventor: Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 59 days.

(21) Appl. No.: 15/203,889

(22) Filed: Jul. 7, 2016

(65) Prior Publication Data

US 2016/0314565 A1 Oct. 27, 2016

Related U.S. Application Data

(63) Continuation-in-part of application No. 13/275,256, filed on Oct. 17, 2011, now Pat. No. 9,390,342.

(51) Int. Cl.
*G06T 5/00* (2006.01)
*G06K 9/36* (2006.01)
(52) U.S. Cl.
CPC ........ *G06T 5/006* (2013.01); *G06K 2009/363* (2013.01); *G06T 2207/10008* (2013.01);
(Continued)
(58) Field of Classification Search
CPC ........... G06T 5/003; G06T 2207/10016; G06T 2207/10004; G06T 5/002; G06T 5/50;
(Continued)

(56) References Cited

U.S. PATENT DOCUMENTS 6,437,823 B1    8/2002   Zhang
6,940,664 B1    9/2005   Pilu
(Continued)

FOREIGN PATENT DOCUMENTS

EP          1453297 B1    9/2004
WO    WO2010/129363 A2    11/2010

OTHER PUBLICATIONS

Sattler et al., On Sampling Focal Length Values to Solve the Absolute Pose Problem, Sep. 2014 [retrivd May 29, 2018], Computer Vision—ECCV 2013:13th European Conference: Proceedings, Part IV, pp. 1-16 + cover page. Retrivd Internet:https://www.researchgate.net/publication/273769298_On_Sampling_Focal_Length_Values_to_Solve_the_Absolute_Pose_Problem.*

(Continued)

*Primary Examiner* — Andrew Moyer
*Assistant Examiner* — Dennis Rosario
(74) *Attorney, Agent, or Firm* — ScienBiziP, P.C.; Alvin Koan (57) ABSTRACT

A system and method are provided for normalizing a camera focal length. A perspective geometry estimator accepts a scanned image from a camera having an undefined focal length, and generates a normalized focal length estimate for the image. The normalized focal length estimate is compared to a normalized focal length density distribution. If the normalized focal length estimate meets a minimum threshold of probability, the normalized focal length estimate is selected and the image is processed using the selected normalized focal length estimate. If the normalized focal length estimate fails to meet the minimum threshold of probability, the image is processed using the highest probability prior normalized focal length from the normalized focal length density distribution.

18 Claims, 3 Drawing Sheets

(52) U.S. Cl.
CPC ............... *G06T 2207/20076* (2013.01); *G06T 2207/20081* (2013.01); *G06T 2207/30176* (2013.01)

(58) Field of Classification Search
CPC .......... G06T 2207/20201; G06T 5/006; H04N 5/2329; H04N 5/23212
See application file for complete search history.

(56) References Cited

U.S. PATENT DOCUMENTS

| | | | |
|---|---|---|---|
| 7,224,392 B2 | 5/2007 | Cahill et al. | |
| 7,327,390 B2 * | 2/2008 | Gallagher | G06T 5/00 348/224.1 |
| 7,623,274 B1 | 11/2009 | Lafevere | |
| 8,203,602 B2 * | 6/2012 | Ren | H04N 7/18 340/5.53 |
| 8,675,988 B2 * | 3/2014 | Chen | G06T 5/002 382/274 |
| 9,224,205 B2 * | 12/2015 | Tsin | G06T 7/181 |
| 2002/0041383 A1 | 4/2002 | Lewis et al. | |
| 2007/0024714 A1 | 2/2007 | Kim et al. | |
| 2011/0069180 A1 | 3/2011 | Nijemcevic et al. | |

OTHER PUBLICATIONS

Szeliski, Computerr Vision: Algorithms and Applications [on-line] Sep. 3, 2010 draft [retrieved Feb. 14, 2018] Fig. 2.1, p. 30. Retrieved from the Internet: http://szeliski.org/Book/; Electronic draft: Sep. 3, 2010.

Zhang et al., Camera Calibration with Lens Distortion from Low-rank Textures, Conference on Comuter Vision and Pattern Recognition (CVPR) 2011, pp. 2321-2328. Retrieved from the Internet: http://perception.csl.illinois.edu/matrix-rank/Files/calibration.pdf.

Gabor, Camera calibration With OpenCV, Generated Dec. 18, 2015 for OpenCV ("Open Source Computer Vision") [retrieved Feb. 15, 2018] pp. 1-7. Retrieved from the Internet: https://docs.opencv.org/3.1.0/d6/d55/tutorial_table_of_content_calib3d.html [title page]; https://docs.opencv.org/3.1.0/d4/d94/tutorial_camera_calibration.html [article].

* cited by examiner

SYSTEM AND METHOD FOR NORMALIZED FOCAL LENGTH PROFILING

RELATED APPLICATIONS

This application is a Continuation-in-part of an application entitled, METHODS, SYSTEMS AND APPARATUS FOR CORRECTING PERSPECTIVE DISTORTION IN A DOCUMENT IMAGE, invented by Richard Campbell, Ser. No. 13/275,256, filed on Oct. 17, 2011, which is now U.S. Pat. No. 9,390,342, issued Jul. 12, 2016, and is incorporated herein by reference.

BACKGROUND OF THE INVENTION

1. Field of the Invention

This invention generally relates to camera-based scanners and, more particularly, to a system and method for using prior knowledge to build models and to improve the estimation of undefined camera focal lengths.

2. Description of the Related Art

The number of imaging devices used to capture mixed-content documents (text, image, and graphics) for business workflows has increased with the adoption of low-cost high-quality cameras and smart phones in the workplace. Unlike conventional flatbed or sheet-fed document scanners, the imaging characteristics of these new devices are not well known. It is often desirable to profile the imaging characteristics of these new capture systems to optimize the image quality of the captured document content and to dewarp the perspective distortions introduced due to the camera's optics and the user's point-of-view. The imaging device itself may embed some of the characteristics within the image meta-data for the captured document. The Japan Electronics and Information Technology Industries Association has published the EXIF standards for specifying image file formations for digital still cameras. The specifications for device meta-data include such tags as (10F Hex) for camera Make and (110 Hex) for camera Model (which can be used to identify the device used to capture the image) and (920A Hex) for lens focal length. However the tag (920A Hex) is often not useful to recover imaging geometry because the sensor size is not encoded in header. A new tag (A405 Hex) is intended to address this issue by specifying the camera's focal length for the captured image as a 35 millimeter (mm) equivalent. This new tag can be used to recover the camera's perspective geometry; unfortunately, it is often missing from many camera manufacturers' implementation of the standard. This has led to the development of many techniques to calibrate imaging sensors.

Figure 1A:
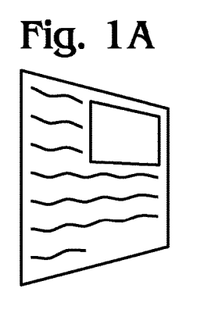
FIG. 1A depicts a perspective distorted document.
Figure 1B:
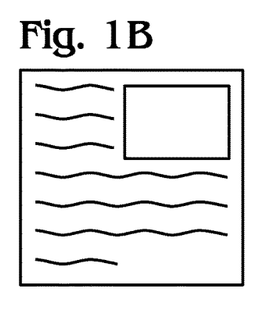
FIG. 1B illustrates an affine correction that preserves the right angles but not the aspect ratio of document.
Figure 1C:
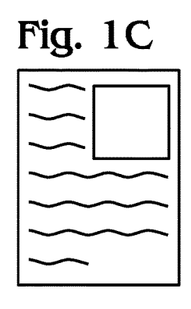
FIG. 1C illustrates a metric rectification that preserves relative distances.

FIG. 1A depicts a perspective distorted document, FIG. 1B illustrates an affine correction that preserves the right angles but not the aspect ratio of document, and FIG. 1C illustrates a metric rectification that preserves relative distances. Document images captured using a digital still camera often contain perspective distortion due to off-axis capturing conditions. This distortion can impede the reader's comprehension of the content and lower optical character recognition (OCR) performance considerably. Distortion effects can be minimized by means of a geometric transformation. In environments where little is known about the captured documents or the camera, multiple solutions may exist due to the degenerate conditions. Only one solution corresponds to the metric rectification that preserves the angles and relative distances between content on the captured document. Solutions that don't preserve the relative distances deviate from document scans produced by traditional scanning methods.

Parent application Ser. No. 13/275,256, provides a good background on the mathematics and issues surrounding the recovery of document and camera properties from unknown scenes. In the section entitled "Geometric Rectification Quality Measures," several tests and heuristic conditions are proposed to determine unstable estimates of the camera focal length and the document normal. The parameters may either be undefined (e.g. single vanishing point) or unreliable (a far vanishing point approaching infinity). In Ser. No. 13/275,256 several methods are introduced to handle these conditions. In some cases the rectification is rejected, and in others it is modified to be a non-metric rectification using defaults calculated from a typical camera. In both instances the rectification results are less than ideal.

Similarly, it is common to resort to non-metric rectifications or to simplify the solutions by utilizing cameras from a known viewing position or a document with known dimensions and/or using a camera with known perspective geometry. Simplifying the problem by eliminating some of the unknowns enables the methods to produce metric rectifications even under difficult conditions. However, the characteristics needed for simplification are not always known.

It would be advantageous if the problem of determining an unknown scanned image focal length could be simplified with the use of accumulated prior estimates.

SUMMARY OF THE INVENTION

Disclosed herein are a system and method of improving robustness in predicting a camera's normalized focal length parameter, which is important for metric rectification and camera-based document scanning. One advantage of the system is in profiling consumer imaging devices. With the increase in the number and diversity of mobile capture devices, knowing each camera's imaging characteristics becomes exceedingly difficult. The sheer number of existing devices makes profiling each imaging system or ad-hoc scene intractable. Additionally, the characteristics of new devices are often unknown and manufacturers do not always embed key system characteristics (such as a 35 mm equivalent focal length) into image headers.

The disclosed method provides a service to a user that enhances camera document captures and, over time, profiles the user's behaviors and devices to improve the system performance under all conditions. More explicitly, the method profiles a camera's normalized focal length over time, where normalized focal length is defined by normalizing the width of the camera sensor or image to a value of 2 while preserving the perspective geometry. The normalization factors out sensor size and resolution from the measure of focal length. This formulation provides a uniform baseline to aggregate and compare imaging systems.

Based on device identity (ID) and/or user ID, and prior focal length estimates, the system builds a model of the density distribution of focal lengths for the device using data from an image enhancement service. The distribution can be used to predict the probability that the device has a fixed focal length lens, determine the most likely estimate, model the user's likelihood of using a particular focal length (zoom value), and provide a good range to limit estimates based on the data. These methods increase the likelihood that the estimated focal length is close to the actual focal length. The derived model also encodes the zoom usage for variable focal length cameras and enables the prediction of the most-likely focal length setting. The model can be tailored to the usage behaviors for an individual or for large populations.

Device profiling of normalized focal length improves camera document scanning. Device profiling can be performed using natural images with no user feedback. User profiling of normalized focal length also improves camera document scanning for variable focal length image systems. As a result, the performance of camera-based scanners is improved even when there is insufficient information about imaging conditions, document and device characteristics, and/or user behavior. Under these circumstances the stability of enhancement techniques for camera-captured document content may be less than desired. The system described herein uses prior knowledge to build models and to improve system performance.

Accordingly, a method is provided for normalizing a camera focal length. The method provides an image enhancement device having a processor, a normalized focal length density distribution database stored in memory, and a perspective geometry estimator application stored in the memory for determining a normalized focal length. A normalized focal length is defined herein as a camera lens focal length determined independent of image resolution. The perspective geometry estimator application accepts a scanned image from a camera having an undefined focal length, and generates a normalized focal length estimate for the image. The method compares the normalized focal length estimate to the normalized focal length density distribution. When the normalized focal length estimate meets a minimum threshold of probability, the normalized focal length estimate is selected and the image is processed using the selected normalized focal length estimate. Typically, the process of generating the normalized focal length estimate for the image may generate a plurality of normalized focal length estimates, with the maximum probability normalized focal length estimate being selected. The normalized focal length estimate may then be added to the normalized focal length density distribution.

However, when the normalized focal length estimate fails to meet the minimum threshold of probability, the normalized focal length estimate is discarded and the image is processed using the highest probability prior normalized focal length from the normalized focal length density distribution.

If a scanned image is accepted from a camera having a zoom lens, one or more normalized focal length estimates is compared to each one of a plurality of density distribution peaks in the normalized focal length density distribution, and the normalized focal length estimate selected is the one meeting the minimum threshold of probability associated with one of the density distribution peaks.

Additional details of the above-described method and an image enhancement device for normalizing a camera focal length are provided below.

DETAILED DESCRIPTION

Figure 2:
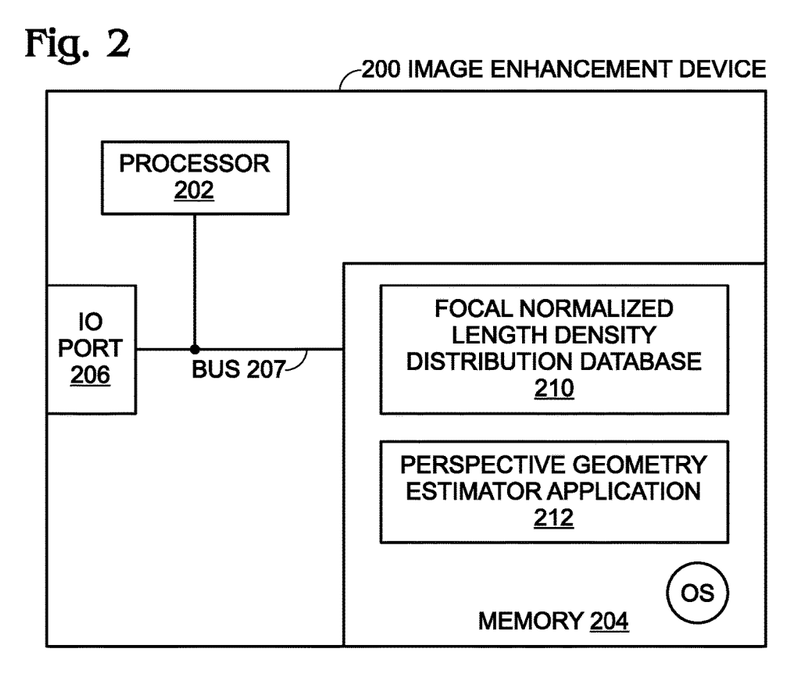
FIG. 2 is a schematic block diagram depicting an image enhancement device for normalizing a camera focal length.

FIG. 2 is a schematic block diagram depicting an image enhancement device for normalizing a camera focal length. The image enhancement device 200 comprises a processor 202, a non-transitory memory 204, and an input/output (IO) port 206 to receive scanned camera images and to supply processed images. A communications bus 207 connects the IO port 206 to the processor 202 and memory 204. A normalized focal length density distribution database 208 is stored in the memory 204. In one aspect, as discussed in more detail below, the normalized focal length density distribution database 208 is segregated in sections such as camera manufacturer, camera model, camera serial number, and user identity. Further, the normalized focal length density distribution database 208 may initially be provided with pre-loaded information such as camera manufacturer, camera model, camera serial number, and a history associated with a user identity. In other aspects however, the image enhancement device 200 may use a normalized focal length density distribution associated with a single device or a single user. In which case a database is not required, and the normalized focal length density distribution information is embedded in the device 200 as part of the perspective geometry estimator application described below, and may be referred to as simply the normalized focal length density distribution. For simplicity however, all the normalized focal length density distribution information is described below as residing in database 210.

The perspective geometry estimator application 210 is also stored in the memory 204, comprising a sequence of processor executable steps for determining a normalized focal length. A normalized focal length is defined herein as a camera lens focal length determined independent of image resolution. The perspective geometry estimator application 210 accepts a scanned image having an undefined focal length, generates a normalized focal length estimate for the image, and compares the normalized focal length estimate to the normalized focal length density distribution database. The perspective geometry estimator application 210 selects the normalized focal length estimate if the normalized focal length estimate meets a minimum threshold of probability, and supplies the image at the IO port 206, processed using the selected normalized focal length estimate. For example, the processed image may be supplied to a display or remote memory (not shown), or stored in memory 204. Then, the perspective geometry estimator application 210 may add the normalized focal length estimate to the normalized focal length density distribution database 208.

Otherwise, the perspective geometry estimator application 210 discards the normalized focal length estimate when the normalized focal length estimate fails to meet the minimum threshold of probability, and processes the image using the highest probability prior normalized focal length from the normalized focal length density distribution database 208.

Typically, the perspective geometry estimator application 210 generates a plurality of normalized focal length estimates, and selects a maximum probability normalized focal length estimate. That is, if more than one estimate meets the minimum probability requirement, the highest probability estimate is used. In one aspect, the perspective geometry estimator application 210 uses a Bayes formula to compare the normalized focal length estimate to a maximum probability normalized focal length from the normalized focal length density distribution database.

In another aspect, the perspective geometry estimator application 210 accepts a scanned image from a camera having a zoom lens, compares the normalized focal length estimate to each one of a plurality of density distribution peaks in the normalized focal length density distribution database 208, and selects the normalized focal length estimate meeting the minimum threshold of probability associated with one of the density distribution peaks. Again, if more than one estimate meets the minimum probability requirement, the highest probability estimate is used.

In one aspect, the perspective geometry estimator application 210 generates the normalized focal length estimate for the image by estimating horizontal vanishing information the image, estimating vertical vanishing information for the image, and performing corner detection on the image. Quadrilateral-boundary detection is performed using a result of the corner detection, the horizontal vanishing information, and the vertical vanishing information, thereby identifying a first bounding quadrilateral. The perspective geometry estimator application 210 determines a first plurality of geometric rectification quality measure values associated with the first bounding quadrilateral, selects a rectification hypothesis based on the first plurality of geometric rectification quality measure values, and uses the selected rectification hypothesis to generate the normalized focal length estimate.

Additional details of this particular method of generating the normalized focal length estimate are provided in Ser. No. 13/275,256, which is incorporated herein by reference. In the section entitled "Geometric Rectification Quality Measures," several tests and heuristic conditions are proposed to determine unstable estimates of the camera focal length and the document normal. The parameters may either be undefined (e.g., single vanishing point) or unreliable (a far vanishing point approaching infinity). In some cases the rectification is rejected; in others it is modified to be a non-metric rectification using defaults calculated from a typical camera. In both instances the rectification results may be less than ideal. However, it should be understood that the image enhancement device 200 is not limited to any particular estimation method. Thus, non-metric rectifications may be used. Solutions can also be simplified by utilizing cameras from a known viewing position, known document dimensions, and/or using a camera with known perspective geometry.

The image enhancement device has essentially been described as a computer device or computer system. In common with other computer devices, it typically employs a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with determining normalized focal length estimation and selecting the best solution. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Although the description above implies that the image enhancement device is an independent stand-alone device for simplicity, it may also be configured as part of a larger system that may, for example, be a camera, tablet computer, or smart phone. Alternatively, components of the image enhancement device may be remotely located from each other. For example, the processor, or database, or perspective geometry estimator may reside in different systems connected to each other via the IO port. The IO port may be a modem, an Ethernet card, or any other appropriate data communications device such as USB. The physical communication links may be optical, wired, or wireless.

Figure 3:
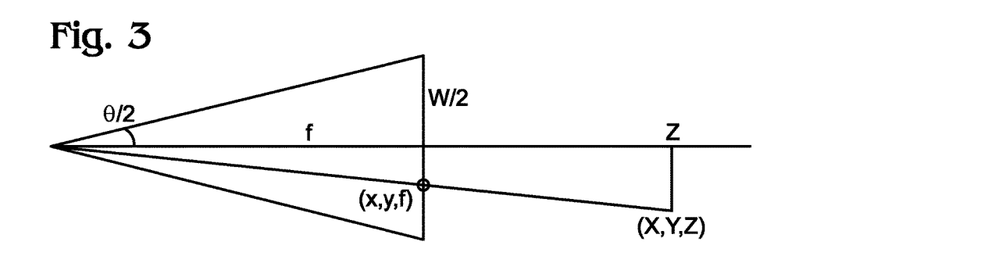
FIG. 3 is an illustration of perspective geometry where theta defines horizontal field of view, W is the width of the sensor or image, f is the focal length, and (x,y) are the projection of the 3D point (X,Y,Z) onto the image plane.

FIG. 3 is an illustration of perspective geometry where theta defines horizontal field of view, W is the width of the sensor or image, f is the focal length, and (x,y) are the projection of the 3D point (X,Y,Z) onto the image plane. It is common in the art to use calibration targets to assist in characterizing imaging devices. These targets have known characteristics than can be used to recover intrinsic and extrinsic camera parameters. Due to the large number of devices, conventional target-based calibration methods are not preferable, as this would require the imaging process to capture specific targets before they use the service. This figure, derived from Richard Szeliski's book "Computer Vision Algorithms and Applications" shows the relationship between focal length, field-of-view, and the projection of a 3D point onto the camera's image plane. Many algorithms use measures in units of pixels or normalized, while camera specifications are typically in metric units.

The convention adopted herein is that the normalized focal length $$\hat{f} = \frac{2f}{W},$$

where W is the width of the image or sensor and f is the focal length in units of pixels or metric. This formulation can be derived by using similar triangles with W=2. The normalized formulation does not depend on image resolution, which can be varied by the user from sample to sample using the same device. The normalized formulation enables the device to be modeled by a single probability mass function. The normalized focal length provides a uniform basis to combine and compare probability mass functions from multiple devices.

One solution recovers the desired intrinsic and extrinsic parameters from the structures in images supplied by users of an image processing application. In a recent conference paper "Camera Calibration with Lens Distortion from Low-rank Textures", CVPR 2011, pp 2321-2328, the authors describe a calibration system that uses textures with unknown patterns to recover the intrinsic camera parameters. The authors show the ability to recover parameters from document content but require the user to specify the region of interest containing the texture.

The methods disclosed herein do not require user intervention and do not use matrix rank minimization optimization techniques to recover the parameters. Rather, the technique utilizes information already calculated in the geometric rectification routines and statistical modeling to determine a probability mass function for the focal length for each device. The statistical model encodes the numerical estimation error and, for devices with adjustable focal lengths, also models the focal length usage pattern. This usage pattern can be encoded for a user or for multiple users of the same camera make and model. In one aspect, a probability mass function is encoded for each user of the device separately.

One advantage of the approach is its ability to handle clutter in the unconstrained imaging environment where the background and alternative information sources introduce competing random or structured patterns into the scene. The disclosed method describes how to form models for the prior using unknown user supplied data and offers various alternatives for forming the likelihood of a given focal length given the data from the current image. In one aspect the models are used with a Bayesian maximum likelihood estimator for focal length.

Figure 4:
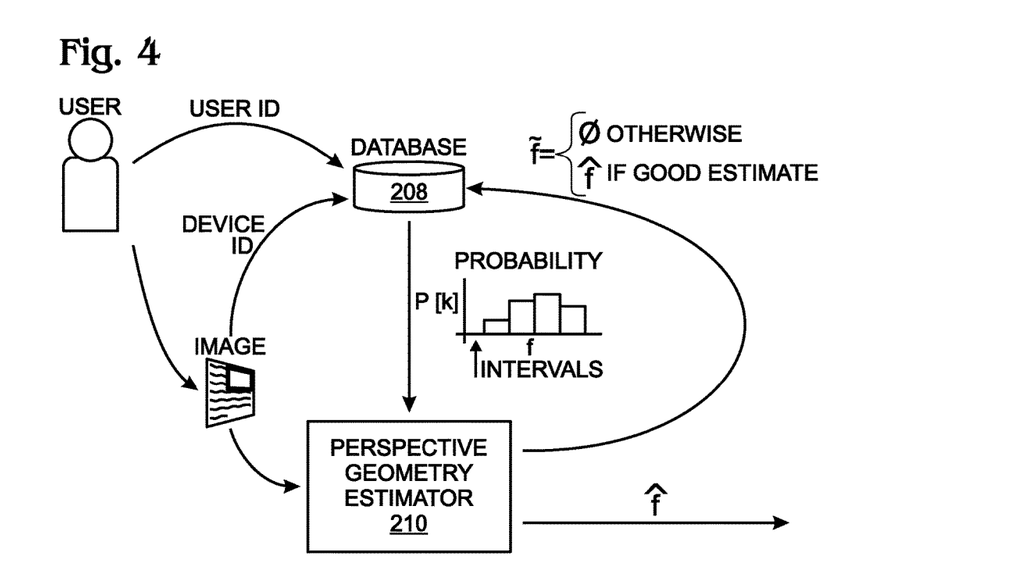
FIG. 4 is a block diagram depicting the building and use of a database of focal length probability mass functions.

FIG. 4 is a block diagram depicting the building and use of a database of focal length probability mass functions. In one aspect, the database contains an entry for a unique probability mass function for each unique device and user ID. The probability mass function is generated using a normalized histogram of the prior focal length estimates from the set of image data with no degenerate data conditions. In an alternative aspect only the device ID indexes the database. The goal of the process is to estimate focal length ($\hat{f}$) to correct camera captured scanned documents and to build a database of focal length priors based on device or user ID (feedback loop f tilde ($\sim$) in the figure).

In one example, the focal length estimate is rejected on the basis of low confidence. Even if the estimate is the most likely solution (out of a list of potential focal lengths) it may be rejected if the likelihood/probability is too low. In this case the probability density function alone is used to select the most probable solution from prior experience. In this case $\hat{f}$ is not a good estimate based on data from the image so the probability density function is not updated. The probability density function is only updated when good estimates are obtained from image data. In this case, the solution (focal length) used to process the image is based on the database of focal length density functions.

In another example, it may be that no viable focal length estimates exist, in which case the probability density function alone is again used to select the most probable solution from prior experience. As in the example above, f is not a good estimate based on data from the image, and the density function is only updated when good estimates are obtained from image data. Thus, instead of using overall default focal length values based, for example, on an average of many types of cameras, the methods described herein return a better default based on experience profiling the users or device values. That is, a list of candidates are compared based on prior knowledge and when no good solution exists, the most likely prior estimate is used as a default based on user or device and not just overall average.

Alternatives exist for learning the focal length prior probability mass function in unsupervised live systems that adapt to users' input as they use a service. The system must choose how to initialize the model, how new data updates the model, and how the model influences the system over time.

Options exist for how the prior probability mass function is initialized and used while learning. In the case where a database entry has been requested for a new device or user, a new model has to be generated, but prior information might be leveraged to initialize the model using existing database entries. In one aspect, if models for the device already exist but from alternative users, then the new model can be instantiated from a composite derived from the existing models with the same device ID. In an alternative aspect, the model may be initialized to a uniform distribution.

In another aspect, if a user ID exists in the database but the device ID is new to the system, then the new model can be instantiated from a composite derived from the user's existing models. In an alternative aspect, the model may be initialized to a uniform distribution. If the user ID and device ID are both new to the system then the new model can be initialized to a uniform distribution. In an alternative aspect, the model can be derived as a composite of all existing models.

Once a new model has been initialized, a learning algorithm of the perspective geometry estimator influences how new data changes the model over time. In one aspect, the data used to build the model is checked by heuristic measures to reject degenerate data (as outlined in Ser. No. 13/275,256). In an alternative aspect, the data may be derived from an unknown process. In another aspect, the existing probability mass function is derived from an initial sample size S1 giving the current model a weight relative to the new samples that will modify the probability mass function. Larger values for S1 result in systems whose models change gradually and take longer to settle to the true distribution, but are less sensitive to noise. On the other hand, smaller values for S1 result in systems that are more aggressive in adapting to the true distribution but are more sensitive to noise and tend to be more unstable initially. In one aspect, S1 is set empirically is 10.

The system may use the live model while information is being learned and used to correct new image samples. Alternatively, the system may use a default model for S2 number of samples to estimate perspective geometry and correct images, e.g., S2 is 100. After S2 samples, the system uses the revised model built using a default model and perspective geometry estimates from the S2 samples.

In one aspect, the database models continue to update given new image data. Alternatively, the model stops being refined after a set S3, with sufficient samples, has been gathered (e.g., S3 is 500) and/or the probability mass function has stabilized. Sufficiency is determined by measuring the change in the probability mass function as a function of samples.

Device and User ID

In one example, the device ID is generated using the Make (10F hex) and Model (110 hex) image meta-data tags. The device ID may be represented by single ASCII string (sID=[sMake,sModel]) formed by concatenating the two ASCII strings from the Make (sMake) and Model (sModel) EXIF tags. The ID's are compared using standard string comparison tools.

Alternatively, the device ID may be generated using lookup tables (LUT's) for the Make and Model tags to convert the ASCII strings into unique numerical codes. In one aspect this alternative device ID is formed using two values [m1,m2], the first identifier is generated using a manufactures LUT (manufactureLUT) and the second identifier is generated using a model LUT (modeLUT).

TABLE 1

An Example of manufactureLUT

| Make | m1 |
|---|---|
| Apple | 1 |
| Canon | 2 |
| Casio | 3 |
| Sony | 4 |
| ... | ... |

TABLE 2

An Example of makeLUT for Apple

| Model | m2 |
|---|---|
| iPhone | 1 |
| iPhone2 | 2 |
| iPhone3G | 3 |
| iPhone3GS | 4 |
| ... | ... |

In one aspect, unique user ID's are assigned to each user. Users can be identified as login credentials to a cloud service. Alternatively, a user can be identified by credentials entered into a smart phone application on the user's device or by the user's device ID as defined by manufacture's serial number, the network ID supplied by the wireless carrier, or by WIFI MAC address. In other aspects, users can be identified using enterprise network credentials or a user's email address.

The Quantization of the Normalized Focal Lengths

To facilitate comparisons and speedy processing, a standard quantization of the normalized focal lengths is used to generate every probability mass function. In one aspect, the normalized focal length values are quantized using a set of non-uniform bin ranges specified by a uniform set of view angles, where the relationship between two is specified by the following equation:

$$\hat{f} = \frac{1}{\tan\left(\frac{\theta}{2}\right)}.$$

For example, the bin boundaries may be specified using the following series: $S\theta_1 = \{[0,2), [2,4), [4,6), \ldots [88,90), [90, \infty)\}$ of angles. Alternatively, the bin boundaries are shifted by a value of 1 $S\theta_2 = \{[0,1), [1,3), [3,5), \ldots [87,89), [89, \infty)\}$ to introduce a redundant quantization of angles. The distribution with the lowest entropy is chosen to represent the probability mass function for the data. The redundant quantization with selection improves the likelihood that similar focal lengths will be grouped together in a single bin. Alternatively, the bin size is chosen to be a function of the expected normalized focal length estimation error. Focal length values falling within a bin are considered equivalent and can be assigned an index value. In another alternative, the space of normalized focal lengths is uniformly quantized.

Bayes Formula for Choosing a Normalized Focal Length Estimate

The Bayes formula for discrete features is stated as:

$$P(\hat{f}_i | \bar{x}) = \frac{P(\bar{x} | \hat{f}_i) P(\hat{f}_i)}{P(\bar{x})}$$

where $\hat{f}_i$ is a normalized focal length hypothesis being proposed and $\bar{x}$ is the image data used to estimate the focal length. The equation can be read as the probability of the focal length given the data is equal to the probability of the data given the focal length, multiplied by the prior probability of the focal length, divided by the probability of the data. Various ways of modeling the prior probability of the focal length have been presented above. Competing hypotheses can be compared using Bayes formula by calculating the numerator of Bayes formula for each hypothesis and choosing the most likely. Note that the denominator is equivalent for each hypothesis so it can be factored out of the decision.

The Calculation of $P(\bar{x}|\hat{f}_i)$; Probability of the Data Given the Proposed Focal Length As described in Ser. No. 13/275,256, linear structures may be detected into vertical and horizontal line groups {Lv, Lh}. Any two pairs in the groups are sufficient to estimate a vanishing point. The enumeration of all sets of horizontal and vertical line pair features can be used to build a set of normalized focal length estimates. These estimates can be histogrammed using the above quantization strategy, or clustered using standard techniques in the art (e.g., K-means). The result is an estimate for the probability of the data given the proposed focal length by counting the number of similar focal length estimates that result from the linear structures within the image. The grouping enables the system to group features into consistent sets. The sets can be used to produce an averaged focal length estimate and as a method for providing a first level segmentation into regions with consistent linear structure.

Figure 5:
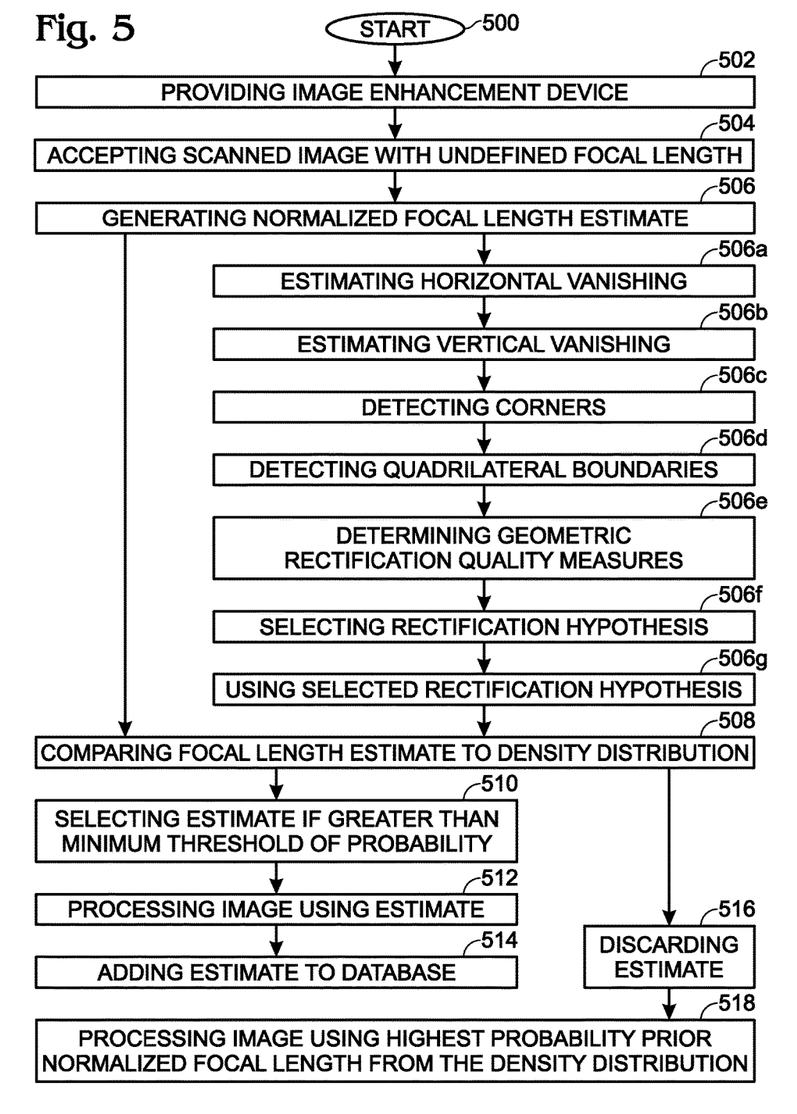
FIG. 5 is a flowchart illustrating a method for normalizing a camera focal length.

FIG. 5 is a flowchart illustrating a method for normalizing a camera focal length. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

Step 502 provides an image enhancement device having a processor, a non-transitory memory, and a normalized focal length density distribution stored in the memory. In one aspect, the normalized focal length density distribution is a database segregated in sections such as camera manufacturer (make), camera model, camera serial number, and user identity. In one variation, the normalized focal length density distribution database is pre-loaded with information such as camera manufacturer, camera model, camera serial number, and a history associated with a user identity.

A perspective geometry estimator application is stored in the memory and comprises a sequence of processor executable steps for determining a normalized focal length, where a normalized focal length is a camera lens focal length determined independent of image resolution. In Step 504 the perspective geometry estimator application accepts a scanned image from a camera having an undefined focal length. Step 506 generates a normalized focal length estimate for the image. Step 508 compares the normalized focal length estimate to the normalized focal length density distribution. Step 510 selects the normalized focal length estimate if the normalized focal length estimate meets a minimum threshold of probability. Typically, generating the normalized focal length estimate for the image in Step 506 includes generating a plurality of normalized focal length estimates. As a result, Step 510 selects the maximum probability normalized focal length estimate. Step 512 processes the image using the selected normalized focal length estimate.

In one aspect, Step 514 adds the normalized focal length estimate to the normalized focal length density distribution. If the normalized focal length estimate fails to meet the minimum threshold of probability, Step 516 discards the normalized focal length estimate, and Step 518 processes the image using the highest probability prior normalized focal length from the normalized focal length density distribution. That is, if the estimate is not likely based on the match with the current focal length distribution, then that solution is pushed back in the priority of possible solutions. If it is the only solution, it may be rejected if it highly unlikely, even if multiple hypothesis exist (that are all unlikely). Instead, a default focal length is used based on overall knowledge, for example, from other cameras or the most common focal length used by the user.

In another aspect, comparing the normalized focal length estimate to the normalized focal length density distribution database in Step 508 includes using a Bayes formula to compare the normalized focal length estimate to the maximum probability normalized focal length from the normalized focal length density distribution.

If Step 504 accepts a scanned image from a camera having a zoom lens, then comparing the normalized focal length estimate to the normalized focal length density distribution in Step 508 includes comparing the normalized focal length estimate to each one of a plurality of density distribution peaks in the normalized focal length density distribution database. Step 510 selects the normalized focal length estimate meeting the minimum threshold of probability associated with one of the density distribution peaks.

As with a fixed focal length camera, if the normalized focal length estimate fails to meet the minimum threshold of probability, Step 516 discards the normalized focal length estimates, and Step 518 processes the image using the highest probability prior normalized focal length from the normalized focal length density distribution. Also as in common with a fixed focal length camera, Step 506 may generate a plurality of normalized focal length estimates, and Step 510 selects the maximum probability normalized focal length estimate.

In one particular example, Step 506 generates the normalized focal length estimate for the image with the following substeps. Step 506a estimates horizontal vanishing information for the image. Step 506b estimates vertical vanishing information for the image. Step 506c performs corner detection on the image. Step 506d performs quadrilateral-boundary detection using the result of the corner detection, the horizontal vanishing information, and the vertical vanishing information, thereby identifying a first bounding quadrilateral. Step 506e determines a first plurality of geometric rectification quality measure values associated with the first bounding quadrilateral. Step 506f selects a rectification hypothesis based on the first plurality of geometric rectification quality measure values, and Step 506g uses the selected rectification hypothesis to generate the normalized focal length estimate.

These substeps provide for a stable mathematical estimation of the focal length estimate, where a focal length hypothesis is rejected or prioritized based on relative reliability of the numerical estimation (heuristic method). The other supporting steps in this method add a statistical framework to weight a hypothesis based on the likelihood of the solution based on prior knowledge on top of, or along with the numerical stability weighting/prioritization. For example, the heuristic method described in Substeps 506a through 506g may be initially used to prune solutions, then the statistical framework weights the remaining solutions and chooses the most likely solution, for example, using a Bayes framework.

A system and method have been provided for deriving a normalized focal length estimate using pre-existing focal length estimates. Examples of particular methods for deriving potential estimates, processes, and hardware units have been presented to illustrate the invention. However, the invention is not limited to merely these examples. Other variations and embodiments of the invention will occur to those skilled in the art.

I claim:

1. A method for normalizing a camera focal length, the method comprising:
   providing an image enhancement device having a processor, a non-transitory memory, a normalized focal length density distribution database stored in the memory, and a perspective geometry estimator application stored in the memory comprising a sequence of processor executable steps for determining a normalized focal length, where a normalized focal length is a camera lens focal length determined independent of image resolution;
   the perspective geometry estimator application accepting a scanned image from a camera having an undefined focal length;
   generating a normalized focal length estimate for the image;
   comparing the normalized focal length estimate to the normalized focal length density distribution database, wherein comparing the normalized focal length estimate to the normalized focal length density distribution database includes using a Bayes formula to compare the normalized focal length estimate to a maximum probability normalized focal length from the normalized focal length density distribution database;
   selecting the generated and compared normalized focal length estimate when the normalized focal length estimate meets a minimum threshold of probability; and,
   correcting the image using the selected normalized focal length estimate.

2. The method of claim 1 further comprising:
   adding the selected normalized focal length estimate to the normalized focal length density distribution database.

3. The method of claim 1 further comprising:
   when the selected, normalized focal length estimate fails to meet the minimum threshold of probability, discarding the normalized focal length estimate; and,
   correcting the image by selecting and using a highest probability prior normalized focal length from the normalized focal length density distribution database.

4. The method of claim 1 wherein generating the normalized focal length estimate for the image includes generating a plurality of normalized focal length estimates; and, wherein selecting the normalized focal length estimate includes selecting a maximum probability normalized focal length estimate.

5. The method of claim 1 wherein the normalized focal length density distribution database is stored in a database segregated in sections selected from a group consisting of camera manufacturer, camera model, camera serial number, and user identity.

6. The method of claim 5 wherein providing the normalized focal length density distribution database includes initially providing a normalized focal length density distribution database pre-loaded with information selected from a group consisting of camera manufacturer, camera model, camera serial number, and a history associated with a user identity.

7. The method of claim 1 wherein accepting the scanned image includes accepting a scanned image from a camera having a zoom lens;
wherein comparing the normalized focal length estimate to the normalized focal length density distribution database includes comparing the normalized focal length estimate to each one of a plurality of density distribution peaks in the normalized focal length density distribution database; and,
wherein selecting the normalized focal length estimate includes selecting the normalized focal length estimate meeting the minimum threshold of probability associated with one of the density distribution peaks.

8. The method of claim 7 further comprising:
when the selected normalized focal length estimate fails to meet the minimum threshold of probability, discarding the selected normalized focal length estimate; and,
correcting the image by selecting and using a highest probability prior normalized focal length estimate from the normalized focal length density distribution database.

9. The method of claim 7 wherein generating the normalized focal length estimate for the image includes generating a plurality of normalized focal length estimates; and,
wherein selecting the normalized focal length estimate includes selecting a maximum probability normalized focal length estimate from the plurality of normalized focal length estimates.

10. The method of claim 1 wherein generating the normalized focal length estimate for the image includes:
estimating horizontal vanishing information for the image;
estimating vertical vanishing information for the image;
performing corner detection on the image;
performing quadrilateral-boundary detection using a result of the corner detection, the horizontal vanishing information, and the vertical vanishing information, thereby identifying a first bounding quadrilateral;
determining a first plurality of geometric rectification quality measure values associated with the first bounding quadrilateral;
selecting a rectification hypothesis based on the first plurality of geometric rectification quality measure values; and,
using the selected rectification hypothesis to generate the normalized focal length estimate.

11. An image enhancement device for normalizing a camera focal length and correcting an image using the normalized camera focal length, the image enhancement device comprising:
a processor;
a non-transitory memory;
an input/output (TO) port to receive scanned camera images and to supply images;
a communications bus connecting the IO port to the processor and memory;
a normalized focal length density distribution database stored in the memory; and,
a perspective geometry estimator application stored in the memory comprising a sequence of processor executable steps for determining a normalized focal length, where a normalized focal length is a camera lens focal length determined independent of image resolution, the perspective geometry estimator application accepting a scanned image having an undefined focal length, generating a normalized focal length estimate for the image, comparing the normalized focal length estimate to the normalized focal length density distribution database, wherein the perspective geometry estimator application uses a Bayes formula to compare the normalized focal length estimate to a maximum probability normalized focal length from the normalized focal length density distribution database,
selecting the generated and compared normalized focal length estimate when the normalized focal length estimate meets a minimum threshold of probability, and supplying the image corrected using the selected normalized focal length estimate.

12. The image enhancement device of claim 11 wherein the perspective geometry estimator application adds the selected normalized focal length estimate to the normalized focal length density distribution database.

13. The image enhancement device of claim 11 wherein the perspective geometry estimator application discards the normalized focal length estimate when the normalized focal length estimate fails to meet the minimum threshold of probability, and corrects the image by selecting and using a highest probability prior normalized focal length from the normalized focal length density distribution database.

14. The image enhancement device of claim 11
wherein the perspective geometry estimator application generating the normalized focal length estimate for the image includes generating a plurality of normalized focal length estimates, and
wherein selecting the normalized focal length estimate includes selecting a maximum probability normalized focal length estimate from the plurality of normalized focal length estimates.

15. The image enhancement device of claim 11 wherein the normalized focal length density distribution database is stored in a database segregated in sections selected from a group consisting of camera manufacturer, camera model, camera serial number, and user identity.

16. The image enhancement device of claim 15 wherein the normalized focal length density distribution database is initially provided pre-loaded with information selected from a group consisting of camera manufacturer, camera model, camera serial number, and a history associated with a user identity.

17. The image enhancement device of claim 11 wherein the perspective geometry estimator application accepts a scanned image from a camera having a zoom lens, compares the normalized focal length estimate to each one of a plurality of density distribution peaks in the normalized focal length density distribution database, and selects the normalized focal length estimate meeting the minimum threshold of probability associated with one of the density distribution peaks.

18. The image enhancement device of claim 11 wherein the perspective geometry estimator application generates the normalized focal length estimate for the image by estimating horizontal vanishing information for the image, estimating vertical vanishing information for the image, performing corner detection on the image, performing quadrilateral-boundary detection using a result of the corner detection, the horizontal vanishing information, and the vertical vanishing information, thereby identifying a first bounding quadrilateral, determining a first plurality of geometric rectification quality measure values associated with said first bounding quadrilateral, selecting a rectification hypothesis based on the first plurality of geometric rectification quality measure values, and using the selected rectification hypothesis to generate the normalized focal length estimate.

* * * * *